Feb. 7, 1961 H. ROSENBERG ET AL 2,971,099
SIGNAL MIXER
Filed April 23, 1959 2 Sheets-Sheet 1

INVENTORS
HARVEY ROSENBERG
RICHARD L. FUSSELL
BY William E. Cleaver
AGENT

INVENTORS
HARVEY ROSENBERG
RICHARD L. FUSSELL
BY
William E. Cleaver
AGENT

United States Patent Office 2,971,099

Patented Feb. 7, 1961

2,971,099

SIGNAL MIXER

Harvey Rosenberg, Drexel Hill, and Richard L. Fussell, Newtown Square, Pa., assignors to Burroughs Corporation, Detroit, Mich., a corporation of Michigan Filed Apr. 23, 1959, Ser. No. 808,374

5 Claims. (Cl. 307—88.5)

This invention relates to signal mixer devices and in particular to a signal mixer for low level signals.

In the prior art there are signal mixer devices which perform the operations of receiving a plurality of simultaneously applied signals on a plurality of input means and providing an output signal proportional to the one signal, of all the signals received, which has the highest (either positive or negative), amplitude. Such a mixer can operate on either the largest positive or largest negative signal as required. A mixer arrangement of the type just described ordinarily employs a plurality of diodes with one connected in series with each of the input means or input signal channels. Each of the diodes has its respective output terminal connected to a common junction and its respective input terminal connected to an associated input signal channel. Further, each diode is arranged with respect to every other diode so that either all the respective cathode terminals are connected as input terminals, or all the respective anode terminals are connected as input terminals, depending upon the polarity of the signals being mixed. In the discussion, hereinafter, the "highest signal" will be considered as a signal on any input channel having the greatest positive, or greatest negative, amplitude, when compared with all the signals being simultaneously applied to all of the input channels of the mixer. Accordingly, with the circuit arrangement described above, the highest signal will pass through the diode of its associated input channel and cause each of the other input channel diodes to be back-biased, or blocked, so that these other diodes cannot conduct. Hence the other input signals are blocked from being transmitted to the mixer output and the output signal which appears at the output means corresponds exclusively to the highest input signal.

In such a mixer circuit arrangement there is an A.-C. and D.-C. signal loss in the form of a voltage drop across the diode which is associated with the channel having the highest signal thereon. The signal loss will result in changing the A.-C. and D.-C. level of an applied varying signal by an amount equal to the voltage drop across the diode. If the change of the levels is small compared to the magnitude of the lowest level of the applied signal, the signal loss is accepted as one of the tolerances of the system in which the mixer is being used. On the other hand, if the change in the level is of the same order of magnitude as the lowest level of the applied signal, these low level signals are highly distorted, and therefore such a level change cannot be tolerated.

In a system requiring the mixing of relatively low level signals, it would be desirable for the mixer circuit to offset the change in the D.-C. level of an applied signal or restore the D.-C. level to the signal which should appear at the output. This produces a substantially unchanged D.-C. component of the output signal corresponding to the highest input signal.

It is therefore an object of the present invention to provide an improved signal mixer device.

It is a further object of the present invention to provide a mixer device for mixing low level signals which yields an output signal substantially equal to the highest of a plurality of received input signals.

In accordance with the objects of the present invention there is provided means to receive a plurality of simultaneously applied signals on a plurality of input means, and to exclusively transmit, with a fixed voltage drop, the highest signal received, and there is also provided further means connected at a common junction to the last mentioned means to further transmit with a fixed voltage rise said highest signal to an output means. Said fixed voltage rise is substantially equal to said fixed voltage loss to offset a change in the D.-C. level of the applied signal, thereby providing an output signal which substantially represents the highest signal applied.

A main feature of the present invention is the provision of a pair of constant (value) current devices, the first of which draws a constant current, which has a selected value, from said common junction point connected between the means to provide the fixed voltage drop and the means to provide the fixed voltage rise, mentioned above, and the second of which supplies a constant current which has a value of one-half of said selected value to be passed through said means to provide the fixed voltage rise, thereby making it necessary (in order to provide said selected current to said common junction point), for the highest signal source to supply through said fixed-voltage-drop means a current equal to the current through said fixed voltage rise means (or equal to one-half the selected value). Hence, there is effected the offset of the fixed voltage drop, or change in D.-C. level, by the fixed voltage rise, described above.

Another main feature of the present invention is that the voltage bias sources, which control the values of the respective currents from the constant current sources, remain in a fixed ratio notwithstanding a change in their respective absolute values. By virtue of such a feature, compensation is provided against power supply variations. The fixed control voltage ratio will insure that current having a value of one-half of the current drawn by said first constant current source will be drawn respectively through each of the voltage drop means and the voltage rise means.

The foregoing and other objects and features of this invention will be best understood by reference to the following description of an embodiment of the invention taken in conjunction with the accompanying drawings, wherein.

Figure 1:
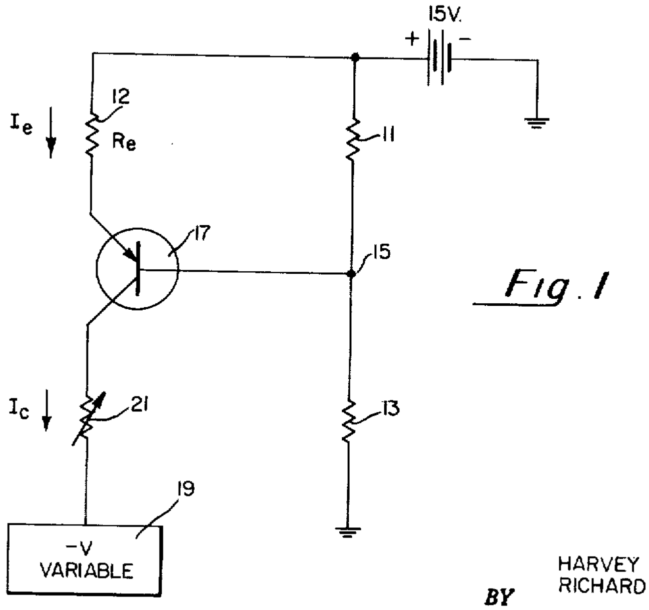
Fig. 1 is a schematic of a transistor circuit functioning as a constant current source.

Referring now to Fig. 1 there is shown an example of a transistor which is common-base connected for use as a constant current source. Reference to a constant current source throughout the specification and the claims is to be understood as a source which either supplies or draws a current having a substantially fixed value and which will continuously either supply or draw this current of fixed value irrespective of load changes at the source output. It is well known that a transistor arranged in a proper circuit configuration can be used as a constant current source, as explained in the text, "Principles of Transistor Circuits," edited by R. F. Shea, published by John Wiley & Sons, New York, 1953.

The circuit in Fig. 1 includes two resistors 11 and 13, forming a voltage divider. By properly selecting the resistors 11 and 13 to be respectively of small resistance values and connecting this voltage divider between suitable voltage supplies (such as shown in Fig. 1 between ground and +15 volts), the current through the voltage divider will be large and the control voltage, or bias voltage, at point 15 will be determined. Base current in a transistor is normally relatively small, for instance, in a preferred embodiment of the present invention the base current is no greater than 1/100 of the value of the current flowing through the voltage divider. It becomes clear then that the control voltage at point 15 can be considered fixed because it is determined by the large current flowing through the voltage divider circuit, and any change in the base current will have a negligible effect on the voltage developed at point 15. The emitter current which passes through the resistor 12 is determined by the relationship between the difference of potential between the +15 volt supply and point 15 divided by the sum of the resistance of the resistor 12 and the impedance at the emitter-base junction of transistor 17. However, since the impedance of the emitter-base junction is relatively small compared to the resistance 12, it can be assumed that any changes in the impedance of the emitter-base junction will have a negligible effect on the emitter current, and therefore the emitter current is primarily determined by the magnitude of the resistance 12 and the aforementioned difference of potential. Since the resistance 12 is constant, and the voltage difference between the +15 volt supply and point 15 is considered constant, it can be concluded that the emitter current is constant and furthermore, that the emitter current is determined by circuit parameters outside of the transistor itself. According to the work of Ebers and Moll, Proceedings of the IRE, December 1954, the following equation holds: $I_c=\alpha I_e+I_{co}$ (emitter junction forward biased, collector junction reverse biased), where $I_c$ is the collector current, $\alpha$ is the current gain factor, and $I_{co}$ is the saturation current as seen at the collector terminal with the emitter circuit open. In a preferred embodiment of the present invention, the transistors, as represented by transistor 17, are silicon transistors. With silicon transistors, the saturation current $I_{co}$ is considered negligible and therefore the term can be dropped from the above equation. It follows therefore from the above equation that if the $I_{co}$ term drops out, and the $\alpha$ term is constant, the collector current will have a constant value if the emitter current has a constant value. Therefore, with the provision of an emitter current with a constant value, as described above, there is provided a collector current with a constant value. Such a collector current will be unchanged by changes in the voltages at the output terminal 19, or the load resistor 21, which fits the definition, above, of a constant current source.

Figure 2:
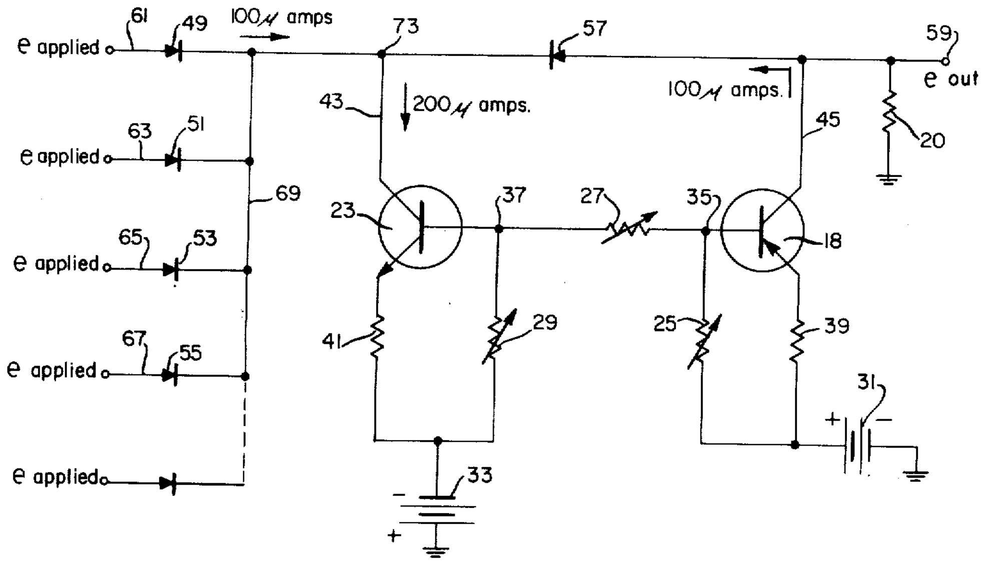
Fig. 2 is a schematic of the present mixer circuit.

In Fig. 2 there are shown two transistors 18 and 23 of different conducting type. The transistor 18 is a PNP type of transistor and corresponds to the transistor 17 of Fig. 1, while the transistor 23 is an NPN type. The control voltages at the respective base elements of the transistors 18 and 23 are provided by connecting a voltage divider circuit, consisting of series-connected variable resistors 25, 27 and 29, between a positive potential source 31 and a negative potential source 33. The resistors 25, 27 and 29 are properly chosen and adjusted to provide a relatively large current through the voltage divider circuit, as well as to provide selected bias voltages, or selected values of control voltages, at the tap points 35 and 37. The provision of the large divider current establishes, in accordance with the discussion of Fig. 1, substantially constant bias voltages (unaffected by the base currents) respectively at taps 35 and 37. It can also be noted at this point that once the resistors 25, 27 and 29 have been adjusted, any change in the absolute value of the supply voltages 31 and 33 will not affect the ratio of the bias voltages at taps 35 and 37.

The resistance values for the resistors 39 and 41 are chosen, as also suggested in the discussion of Fig. 1, to determine, in conjunction with the chosen bias voltages at points 35 and 37, the respective emitter currents and consequently the respective collector currents. In a preferred embodiment, the circuit parameters are chosen to provide a collector current ($I_c$) for transistor 23 which will be twice the collector current ($I_c$) provided by the transistor 18. Since the transistor 18 is furnishing only one-half of the current drawn by the transistor 23, then the other half of the current (in order to satisfy the current requirements at the collector of transistor 23) must be supplied through one or more of diodes 49, 51, 53 and 55. If the channel with the highest signal thereon "takes over" and provides a potential on the common line 69 which blocks, or back biases, each of the channels excepting the highest channel, then said other half of the current drawn, or required, by the transistor 23 will be supplied through the diode associated with the channel having the highest signal thereon.

For purposes of discussion let it be assumed that channel 61 has the highest signal thereon and each of the other channels 63, 65 and 67 have had their respective diodes blocked. If the current drawn by the transistor 23 is 200 microamperes, as it is in a preferred embodiment, then 100 microamperes will be drawn through the diode 49 and 100 microamperes will be drawn through the diode 57. If the diodes 49 and 57 are matched, that is, are chosen to each have the same voltage drop in the forward conducting direction at 100 microamperes, then the voltage drop across the diode 49 will equal the voltage rise (considered from cathode to anode) across the diode 57. Since the load resistor 20 is very large and draws a relatively small current, it follows that a fixed change in the D.-C. level of an applied varying signal which results from the voltage drop across the diode 49 will be restored, or offset, by a voltage rise across the diode 57 to provide an output signal at the terminal 59 which substantially equals the input signal on channel 61.

If the circuit shown in Fig. 2 were used to mix applied negative signals for the purpose of providing an output signal substantially resembling the highest negative applied signal, the transistors 18 and 23 would be interchanged in the circuit configuration; the diodes 49, 51, 53, 55 and 57 would be connected with reverse polarity from that shown in Fig. 2; and the sources of potential 31 and 33 would be interchanged.

In a preferred embodiment the diodes 49, 51, 53, 55 and 57 are matched at 100 microamperes. These diodes preferably are fast-switching junction silicon diodes having a voltage rating of 125 volts and a leakage current of 0.25 microampere, for example, SG-212 diodes manufactured by the Transitron Corp. The diodes could be matched at some other current value and in accordance therewith the transistors 18 and 23 would be controlled to supply the particular rated current. Silicon diodes are preferably used because silicon diodes (and silicon transistors) have extremely low thermal currents, and the present invention may be used in a system operative with a large ambient temperature range. At high temperatures, with silicon diodes, there is negligible current flow in the reverse direction even though the diodes are reversed biased. It has been found that at high temperatures, if germanium diodes are used, there will be current passing in the reverse direction through the reverse biased germanium diodes such that the current drawn through the forward biased diode becomes in excess of the matched current value. Therefore, the voltage drop across the highest channel diode (the forward biased diode) is greater than the voltage rise across the series-connected diode, and this gives rise to a mismatch, causing an offset in the output D.-C. level. However, in systems where ambient temperatures are not high, and a small number of inputs are to be mixed, germanium diodes and germanium transistors can be used satisfactorily in the present invention.

In a preferred embodiment, 100 microamperes current was chosen because (1), better diode matching occurs at relatively higher currents, and (2), there is better frequency response at higher currents. On the other hand, at a lower current, for instance, at a selected current of 50 microamperes, it has been found that the highest signal "takes over" at a lower signal voltage than at a selected current of 100 microamperes. A selected current of 50 microamperes would increase the lower level of the signal range which can be handled, but this will be more fully understood from the discussion in connection with Fig. 3.

Figures 3, 4:
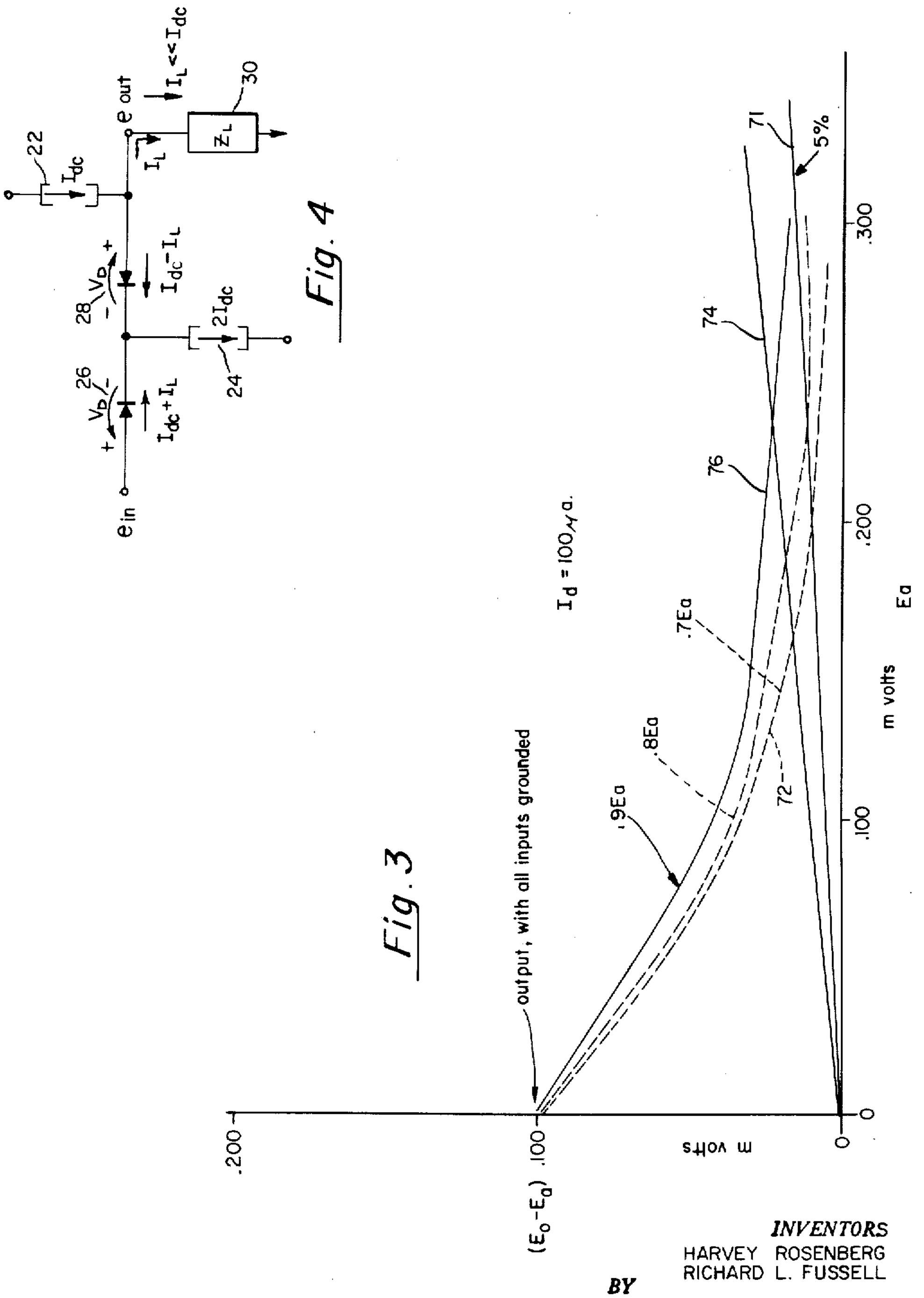
Fig. 3 is a graph showing the relationship between applied signals and the difference between output signals and applied signals.
Fig. 4 is a schematic of the over-all circuit showing the current relationship.

In Fig. 3 there is shown a set of curves plotted for selected current of 100 microamperes for a 13 input mixer. The line 71 on the graph is designated at the 5% line, which means that the points where this 5% line intersects with the curves represent the points at which the difference between the output voltage and the applied voltage is less than 5% of the applied voltage. It will be noted from Fig. 3 that if all the "other channels," excluding the channel with the highest signal thereon, are supplying signals having maximum values of .9 (nine-tenths) of the highest signal, the highest signal must be approximately 300 millivolts before the output signal will be greater than 95% of the highest signal (or intersect the 5% line). If the system is to provide output signals which are greater than 95% of the input signals, then the intersections of the various curves with the 5% line represent the limits of the low level signals to be handled by the system. If it is contemplated that the system may receive maximum signals of .9 (nine-tenths) of the highest signal on each of the "other channels," then from Fig. 3 it is seen that the low level of the signal range to be handled is approximately 300 millivolts (at a selected current of 100 microamperes). It can be noted from curve 72 of Fig. 3 (the 0.7 curve) that if the "other channels" supply signals having maximum values of only .7 (seven-tenths) of the highest signal, an input signal of 200 millivolts will "take over," as is seen from the intersection of the 5% line with curve 72 at 200 millivolts.

It should be noted that if, in general, the remaining input signals are much less than the highest input, and the diodes are matched to, for example, ±5 millivolts, then the minimum "take over" signal for 5% accuracy would be 100 millivolts.

The curves of Fig. 3, as mentioned above, were plotted for a selected current of 100 microamperes. For every other value of selected current, the lower limit of the applied signal range will be respectively different, that is, the intersection of the 5% line will be at a different point. It can be shown, for instance, that at a selected current of 50 microamperes, the highest signal will "take over," i.e., will intersect the 5% line at approximately 220 millivolts, assuming all "other channels" are supplying .9 (nine-tenths) of the highest signal. Since at 50 microamperes a low level signal limit can be obtained which is lower than the low level signal at selected current of 100 microamperes, it raises a question as to the choice of 100 microamperes in the preferred embodiment. In the system in which the preferred embodiment of the invention is presently actually employed, the "other chanels" were limited to provide signals less than .7 (seven-tenths) of the highest signal, which condition, as already considered, provides a satisfactory low level signal limit of 200 millivolts. On the other hand, since the actual system operates at 20 kc. the recognition of (1) better frequency response at 100 microamperes than at 50 microamperes, and (2) of better diode matching at the higher current, resulted in the choice of 100 microamperes for the preferred embodiment.

If the tolerances of the system are increased, for instance, if it is requisite for the system to provide output signals greater than 90% rather than 95% of the highest signal input, the range of the applied signals to be handled can be increased, especially toward lowering the low level signal limit. This last conclusion is evidenced in Fig. 3 by the intersection of the curves with the 10% line 74, which shows that (with .9 (nine-tenths) at the highest signal on the other channels) the highest signal would "take over" at approximately 200 millivolts.

Fig. 4 is a schematic summary of the circuit. The two constant current sources 22 and 24 are respectively supplying $I_{d.c.}$ and drawing $2I_{d.c.}$. The approximate A.-C. current path, shown by $I_L$ is through the two diodes 26 and 28, and through the load 30 (where the loading effects of the constant current source is negligible). The A.-C. current component $I_L$ is very much smaller than the D.-C. current component so as to have a negligible effect insofar as causing an unbalance of the voltage drops across the diodes 26 and 28.

If a mixer application should require a D.-C. level restoration greater or lesser than the D.-C. level loss across the highest channel diode, the ratio of the values of the currents supplied by the one constant current source and drawn by the other constant current source can be fixed at some value other than 1:2 as in the description above of the preferred embodiment.

While we have described above the principles of our invention in connection with the specific apparatus, it is to be clearly understood that this description is made only by way of example, and not as a limitation of the scope of our invention as set forth in the objects thereof, and in the accompanying claims.

What we claim is:

1. A signal mixer circuit for mixing low level signals transmitted thereto from a plurality of channels wherein the mixer output signal at any selected time must have a value substantially equal to the highest input signal of all the signals received at said selected time comprising, a series-connected unidirectional current flow device, a plurality of signal unidirectional current flow devices, each of said unidirectional current flow devices having a voltage drop in the forward conducting direction, at a predetermined current value, which is equal, said signal unidirectional current flow devices having their respective signal input elements for connection to an associated input signal channel and their respective signal output elements connected to a common point so that in response to said highest input signal each signal unidirectional current flow device will be blocked excepting the unidirectional current flow device associated with the channel having the highest input signal thereon, said series-connected unidirectional current flow device having its signal output element connected to said common point, a voltage divider circuit having first and second end terminals to be connected across a potential difference to provide at least first and second different valued bias points, first and second electron transfer devices each having an input element, an output element, and a control element, said first electron transfer device having its output element coupled to the signal input element of said series-connected unidirectional current flow device, its control element coupled to said first bias point, and its input element circuitry coupled to the first end terminal of said voltage divider circuit, said first electron transfer device thus connected to provide a current having a predetermined constant value, said second electron transfer device having its output element connected to said common point, its control element connected to said second bias point, and its input element circuitry connected to said second end terminal of said voltage divider circuit, said second electron transfer device connected in such manner to provide a constant current having a current value which is twice that of said predetermined current value, said second electron transfer device drawing at said common point first current through said series-connected unidirectional current flow device and second current through said signal unidirectional current flow device associated with the channel having the highest signal thereon, said first and second currents each having a value substantially equal to said predetermined current value to effect a nullification of the voltage drop across said last mentioned signal unidirectional current flow device by a voltage rise across said series-connected unidirectional current flow device when considered from said common point, and output signal means coupled to the input element of said series-connected unidirectional current flow device to provide the net signal after said last mentioned voltage drop nullification thereby providing an output signal substantially equal to the highest input signal appearing on said channels.

2. A signal mixer circuit according to claim 1 wherein said first electron transfer device comprises a PNP transistor and wherein said second electron transfer device comprises a NPN transistor.

3. A signal mixer circuit according to claim 1 wherein said voltage divider circuit includes three variable resistor elements.

4. A signal mixer circuit according to claim 1 wherein said unidirectional current flow devices each comprise a fast switching silicon diode and wherein said predetermined current value is 100 microamperes.

5. A mixer circuit for mixing low level signals transmitted thereto simultaneously from a plurality of channels wherein the low level signals are in the order of 200 millivolts to 6 volts and wherein the mixer output signal must have a value within plus or minus 5% of the highest input signal comprising, a series-connected silicon diode, a plurality of signal silicon diodes, each of said diodes having a voltage drop in the forward conducting direction, at 100 microamperes, which is equal, said signal silicon diodes having means at their respective anodes for connection to an associated input signal channel and their respective cathodes connected to a common point so that each signal diode will be biased to nonconduction excepting the signal diode associated with the channel having the highest signal thereon, said series silicon diode having its cathode connected to said common point, first and second D.-C. voltage reference sources, a voltage divider network coupled between the positive output of said first voltage reference source and the negative output of said second voltage reference source, a first transistor having its collector element coupled to the anode of said series-connected diode, its base element connected to said voltage divider network to provide a first predetermined base biasing voltage thereat, and its emitter element connected through a resistor to said positive output of said first voltage reference source to provide a substantially constant emitter current in conjunction with said first base biasing voltage, said first transistor device being a constant current source to supply a current of 100 microamperes to the anode of said series-connected diode, a second transistor device having its collector coupled to said common point, its base coupled to said voltage divider network to provide a second predetermined base biasing voltage thereat and its emitter element coupled through a resistor to the negative output of said second voltage reference source to provide a substantially constant emitter current in conjunction with said second base biasing voltage, said second transistor device serving as a constant current source to draw 200 microamperes to its collector element, said second transistor thereby drawing 100 microamperes current respectively through both said signal diode associated with the channel having the highest signal thereon and through said series-connected diode to effect a nullification of the voltage drop across said last mentioned signal diode by a voltage rise across said series-connected diode, a load coupled to the anode of said series-connected diode to provide an output means such that the signal developed thereacross represents an output signal within plus or minus 5% of the highest signal applied to said input channels.

References Cited in the file of this patent

UNITED STATES PATENTS

| | | |
|---|---|---|
| 2,782,303 | Goldberg | Feb. 19, 1957 |
| 2,787,707 | Cockburn | Apr. 2, 1957 |